United States Patent [19]
Tonn

[11] Patent Number: 5,571,299
[45] Date of Patent: Nov. 5, 1996

[54] DUST COLLECTOR

[76] Inventor: Harold H. Tonn, 13105 W. Scarborough Dr., New Berlin, Wis. 53051

[21] Appl. No.: 430,731

[22] Filed: Apr. 28, 1995

[51] Int. Cl.⁶ ................................... B01D 46/04
[52] U.S. Cl. ............ 55/302; 55/341.7; 55/350.1; 55/484; 95/280; 95/286
[58] Field of Search ............ 95/279, 280, 286; 55/283, 293, 302, 482, 484, 350.1, 341.7, 341.1

[56] References Cited

U.S. PATENT DOCUMENTS

| | | | |
|---|---|---|---|
| 3,363,405 | 1/1968 | Baxendale | 55/341.1 |
| 3,395,517 | 8/1968 | Lang et al. | 55/302 |
| 3,606,737 | 9/1971 | Lefevre | 55/484 |
| 3,630,005 | 12/1971 | Reinauer | 55/341.1 |
| 4,243,536 | 1/1981 | Prolss | 55/484 |
| 4,509,960 | 4/1985 | Engel | 55/481 |
| 4,610,704 | 9/1986 | Richard | 55/302 |
| 4,666,472 | 5/1987 | Klimczak et al. | 95/280 |
| 4,789,387 | 12/1988 | Nemesi et al. | 95/280 |
| 5,078,760 | 1/1992 | Haldipur et al. | 95/286 |
| 5,256,175 | 10/1993 | Zievers et al. | 55/302 |

FOREIGN PATENT DOCUMENTS

| | | | |
|---|---|---|---|
| 5-220315 | 8/1993 | Japan | 55/484 |
| 683789 | 9/1979 | U.S.S.R. | 55/484 |

*Primary Examiner*—Jay H. Woo
*Assistant Examiner*—Duane S. Smith
*Attorney, Agent, or Firm*—Michael, Best & Friedrich

[57] ABSTRACT

A dust collector including a housing including a contaminated air inlet, and a clean air outlet, an exhaust conduit extending generally horizontally within the housing and communicating with the clean air outlet, at least one upper filter element extending generally vertically and upwardly from the exhaust conduit, the upper filter element having an open lower end communicating with the exhaust conduit, and at least one lower filter element extending generally vertically and downwardly from the exhaust conduit, the lower filter element including an open upper end communicating with the exhaust conduit, wherein contaminated air enters the housing via the air inlet and flows through the filter elements, leaving contaminants thereon, and wherein air cleaned by the filter elements flows out of the housing through the exhaust conduit and the clean air outlet.

14 Claims, 2 Drawing Sheets

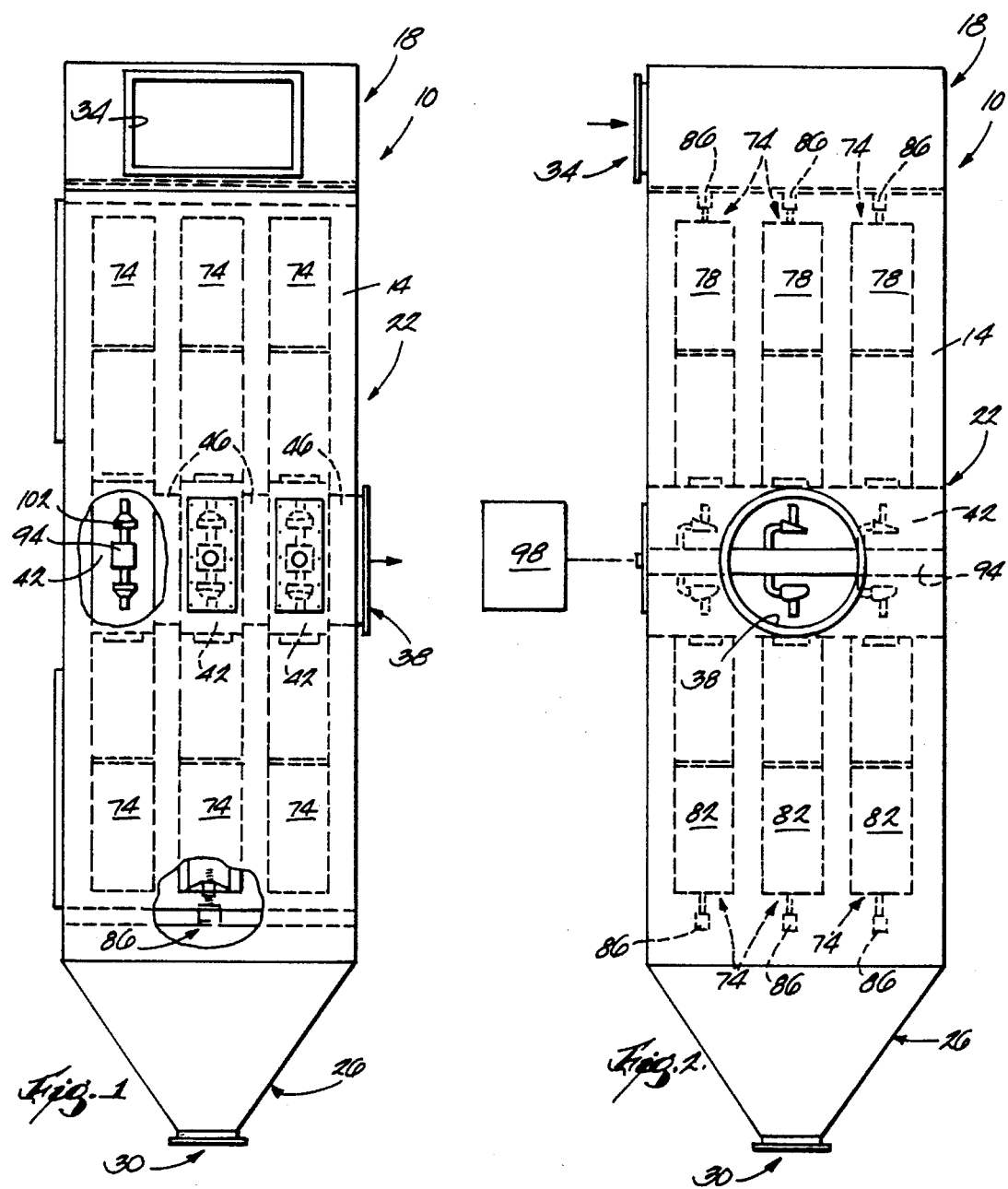

DUST COLLECTOR

BACKGROUND OF THE INVENTION

The invention relates to industrial filter systems such as dust collectors of the type disclosed in U.S. Pat. No. 4,610, 704. A conventional dust collector comprises a housing or hopper having a contaminated air inlet near its upper end, a dust discharge outlet at its lower end, and a clean air outlet intermediate the upper and lower ends. Supported within the housing are a number of generally cylindrical, hollow filter elements located between the contaminated air inlet and the clean air outlet such that contaminated air flows through the filter elements before leaving the housing through the clean air outlet. Each filter element has an open end communicating with a duct that in turn communicates with the clean air outlet. In order to remove contaminants accumulated on the filter elements, means are provided for directing a reverse flow of compressed air into the open end of each filter element. One such means is disclosed in Pat. No. 4,610,704. Other such means are disclosed in Pat. Nos. 4,666,472 and 4,789,387.

SUMMARY OF THE INVENTION

The invention provides an improved arrangement of filter elements within a dust collector. Specifically, the invention provides a dust collector with one or more exhaust ducts extending horizontally in the housing, with filter elements extending both upwardly and downwardly from each exhaust duct. Preferably a number of filter elements extend upwardly from the exhaust duct, with the open lower end of each of these filter elements communicating with the exhaust duct, and a number of filter elements extending downwardly from the exhaust duct, with the open upper end of each of these filter elements communicating with the exhaust duct. Contaminated air enters the upper end of the housing through an inlet, flows downwardly to the filter elements, flows through the filter elements to the exhaust duct(s), and flows out of the housing through the exhaust duct(s). Means are provided for directing reverse air flow into the filter elements for cleaning the filter elements.

This arrangement provides an extremely compact dust collector, with minimal ductwork, and with all of the advantages of known downflow dust collectors. Having filter elements extend both upwardly and downwardly from the exhaust ducts allows twice as many filter elements in a given footprint.

Other features and advantages of the invention will become apparent to those skilled in the art upon review of the following detail description, claims and drawings.

DESCRIPTION OF THE DRAWINGS

FIG. 1 is a front elevational view of a dust collector embodying the invention.

FIG. 2 is a right side elevational view of the dust collector.

Figure 3:
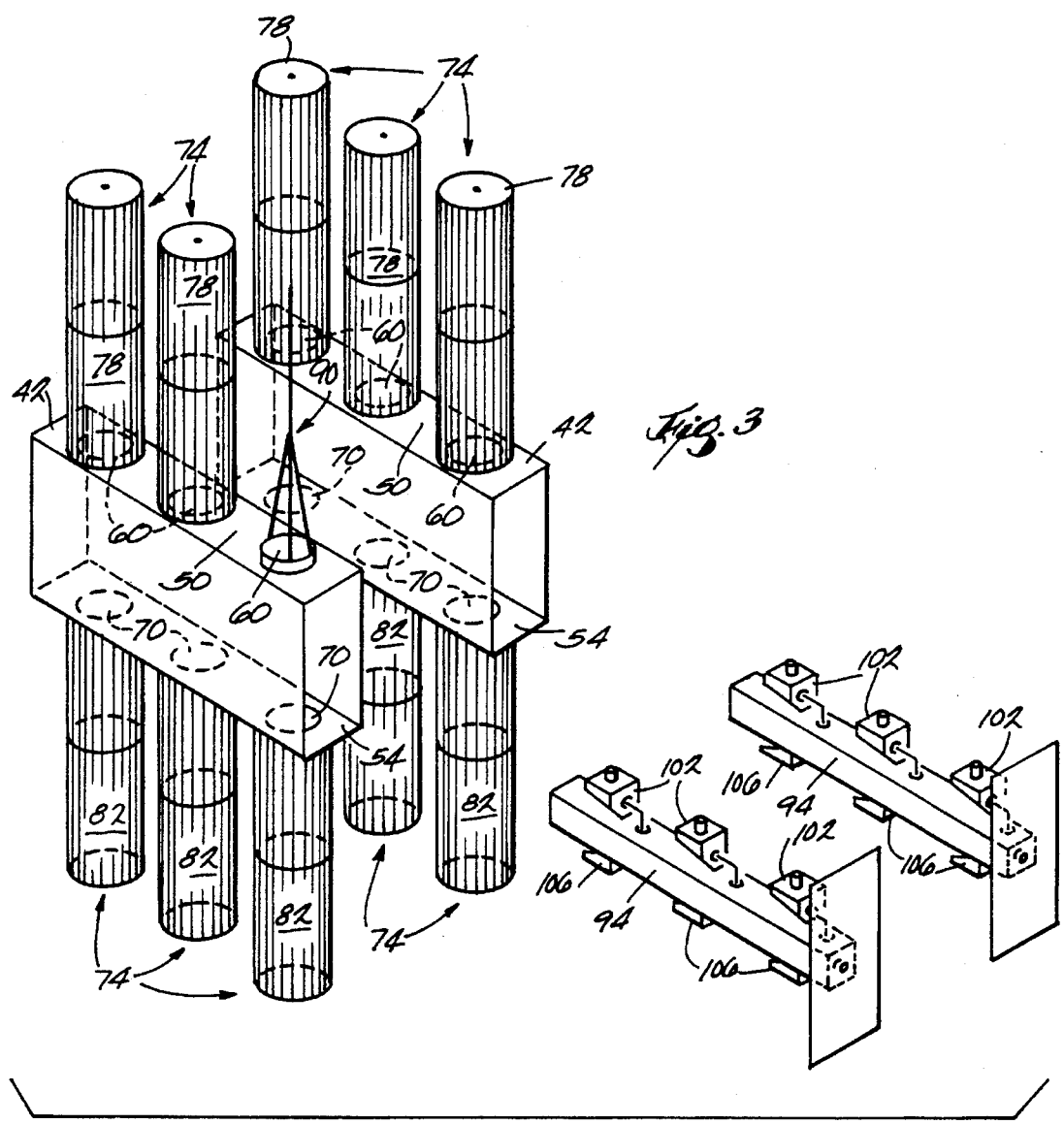
FIG. 3 is an exploded view of portions of the dust collector.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A dust collector 10 embodying the invention is shown in the drawings. The dust collector 10 comprises a housing 14 supported above the ground by suitable means such as legs (not shown). The housing 14 includes an upper inlet portion 18, an intermediate portion 22, and a lower portion 26 that tapers downwardly to a dust discharge opening 30. The inlet portion 18 has therein a contaminated air inlet 34 for the admission of contaminated or particulate laden air or gases. The intermediate portion 22 has therein, on the right side as shown in FIG. 1, a clean air outlet 38.

Three box-like exhaust conduits or plenums 42 (only two are shown in FIG. 3) are supported within the intermediate portion 22 of the housing 14. The exhaust conduits 42 extend horizontally and from front to back and are equally spaced from left to right. Except as described below, the exhaust conduits 42 are closed. The conduits 42 communicate with and are connected by a main exhaust conduit 46 (see FIG. 1) which extends perpendicular to the exhaust conduits 42 and has a right end communicating with the outlet 38. Each of the exhaust conduits 42 has (see FIG. 3) a horizontal top wall 50 and a horizontal bottom wall 54. The top wall 50 of each exhaust conduit 42 has therein three inlet openings 60 and the bottom wall 54 of each conduit has therein three inlet openings 70.

The dust collector 10 also comprises a conventional filter element 74 communicating with each of the inlet openings 60 and 70, for a total of eighteen filter elements in the illustrated construction. While the illustrated filter elements 74 are rigid cartridge-type filters closed at one end and open at the other end, any suitable filter element, such as flexible filter bags, could be employed. Suitable filter elements are disclosed in U.S. Pat. Nos. 4,610,704, 4,666,472 and 4,789, 387, all of which are incorporated herein by reference. More particularly, three upper filter elements 78 extend upwardly, along respective vertical axes, from each exhaust conduit 42, and each of these filter elements 78 has a closed upper end and an open lower end communicating with a respective air inlet 60. Also, three lower filter elements 82 extend downwardly, along respective vertical axes, from each exhaust conduit 42, and each of these filter elements 82 has a closed lower end and an open upper end communicating with a respective air inlet 70. Each of the upper elements 78 is coaxial with, i.e. extends along a common vertical axis with, a respective one of the lower elements 82. Conventional mechanisms 86 (see FIGS. 1 and 2) and 90 (see FIG. 3) support the filter elements 74.

It should be understood that dust collectors embodying the invention can have any number of exhaust conduits 42 and any number of filter elements 74 on each conduit.

During normal filtering operation of the dust collector 10, contaminated air flows into the housing 14 through the inlet 34, flows downwardly through the housing 14 into the intermediate portion 22, and flows through the filter elements 74. Particulates or contaminants collect on the filter elements 74 as the air passes through the filter elements. Air cleaned by the filter elements flows into the exhaust conduits 42 via the air inlets 60 and 70, and flows out of the housing 14 through the clean air outlet 38.

Means are provided for reverse flow cleaning of the filter elements 74. In the illustrated construction, each exhaust conduit 42 has therein (see FIG. 3) a horizontally extending cleaning air conduit 94. Each cleaning air conduit 94 communicates with a source of compressed air 98 (shown schematically in FIG. 2). Three diaphragm valves 102 are located above each conduit 94, each valve 102 beneath a respective one of the air inlets 60, and three diaphragm valves 106 are located below each conduit 98, each valve 106 above a respective one of the air inlets 70. The valves 102 and 106 are preferably one-inch diaphragm valves controlled by solenoids (not shown), as is known in the art. The valves 102 and 106 communicate with the conduit 98 such that, when the valves are opened, each valve directs a reverse flow of air into the associated filter element 74 so as to remove accumulated particulates or contaminants from the filter medium. Such reverse flow cleaning is well known in the art and will not be described in greater detail. Other suitable arrangements for reverse flow cleaning are disclosed in U.S. Pat. No. Nos. 4,610,704, 4,666,472 and 4,789,387. Dust removed from the filter elements 74 accumulates in the lower portion 26 of the housing 14 and can be removed by opening the discharge opening 30.

Various features of the invention are set forth in the following claims.

I claim:

1. A dust collector comprising a housing including a contaminated air inlet, and a clean air outlet, an exhaust conduit extending generally horizontally within said housing and communicating with said clean air outlet, at least one upper filter element extending generally vertically and upwardly from said exhaust conduit, said upper filter element having an open lower end communicating with said exhaust conduit, and at least one lower filter element extending generally vertically and downwardly from said exhaust conduit, said lower filter element including an open upper end communicating with said exhaust conduit, wherein contaminated air enters said housing via said air inlet and flows through said filter elements, leaving contaminants thereon, and wherein air cleaned by said filter elements flows out of said housing through said exhaust conduit and said clean air outlet.

2. A dust collector as set forth in claim 1 wherein said housing includes an upper portion having therein said contaminated air inlet, a lower portion, and an intermediate portion between said upper and lower portions, said intermediate portion having therein said clean air outlet, and wherein said exhaust conduit extends generally horizontally within said intermediate portion.

3. A dust collector as set forth in claim 2 wherein said lower portion has therein a dust discharge opening, wherein said dust collector also comprises means in said exhaust conduit for directing a reverse flow of cleaning air into said upper and lower filter elements, and wherein contaminants collected on said filter elements are removed from said filter elements by said reverse flow means and are removed from said housing via said discharge opening.

4. A dust collector as set forth in claim 1 and comprising a plurality of upper filter elements extending generally vertically and upwardly from said exhaust conduit, each of said upper filter elements having an open lower end communicating with said exhaust conduit, and a plurality of lower filter elements extending generally vertically and downwardly from said exhaust conduit, each of said lower filter elements including an open upper end communicating with said exhaust conduit.

5. A dust collector as set forth in claim 1 wherein said air inlet is connectable to a source of contaminated air such that contaminated air enters said housing via said air inlet and flows through said filter elements, leaving contaminants thereon, and such that air cleaned by said filter elements flows out of said housing through said exhaust conduit and said clean air outlet.

6. A dust collector as set forth in claim 1 wherein said upper filter element has a closed upper end, and wherein said lower filter element has a closed lower end.

7. A dust collector as set forth in claim 1 wherein each of said upper filter elements extends along a common vertical axis with a respective one of said lower filter elements.

8. A dust collector comprising a housing including an upper portion having therein a contaminated air inlet, a lower portion having therein a dust discharge opening, and an intermediate portion between said upper and lower portions, said intermediate portion having therein a clean air outlet, an exhaust conduit extending generally horizontally within said intermediate portion and communicating with said clean air outlet, a plurality of upper filter elements extending generally vertically and upwardly from said exhaust conduit, each of said upper filter elements having a closed upper end and an open lower end communicating with said exhaust conduit, a plurality of lower filter elements extending generally vertically and downwardly from said exhaust conduit, each of said lower filter elements including a closed lower end and an open upper end communicating with said exhaust conduit, and means in said exhaust conduit for directing a reverse flow of cleaning air into each of said upper and lower filter elements, wherein contaminated air enters said housing via said air inlet and flows through said filter elements, leaving contaminant thereon, wherein air cleaned by said filter elements flows out of said housing through said exhaust conduit and said clean air outlet, and wherein contaminants collected on said filter elements are removed from said filter elements by said reverse flow means and are removed from said housing via said discharge opening.

9. A dust collector as set forth in claim 8 wherein each of said upper filter elements extends along a common vertical axis with a respective one of said lower filter elements.

10. A dust collector comprising a housing including an upper portion having therein a contaminated air inlet, a lower portion having therein a dust discharge opening, and an intermediate portion between said upper and lower portions, said intermediate portion having therein a clean air outlet, a plurality of exhaust conduits each extending generally horizontally within said intermediate portion and communicating with said clean air outlet, a plurality of upper filter elements extending generally vertically and upwardly from each of said exhaust conduits, each of said upper filter elements having a closed upper end and an open lower end communicating with the associated exhaust conduit, a plurality of lower filter elements extending generally vertically and downwardly from each of said exhaust conduits, each of said lower filter elements including a closed lower end and an open upper end communicating with the associated exhaust conduit, and means in said each of exhaust conduits for directing a reverse flow of cleaning air into each of the associated upper and lower filter elements, wherein contaminated air enters said housing via said air inlet and flows through said filter elements, leaving contaminant thereon, wherein air cleaned by said filter elements flows out of said housing through said exhaust conduits and said clean air outlet, and wherein contaminants collected on said filter elements are removed from said filter elements by said reverse flow means and are removed from said housing via said discharge opening.

11. A dust collector as set forth in claim 10 wherein said exhaust conduits are generally parallel.

12. A dust collector as set forth in claim 10 wherein said exhaust conduits communicate with said air outlet via a common main exhaust conduit.

13. A dust collector as set forth in claim 10 wherein said dust collector comprises a number of upper filter elements and the same number of lower filter elements communicating with each of said exhaust conduits.

14. A dust collector as set forth in claim 10 wherein each of said upper filter elements extends along a common vertical axis with a respective one of said lower filter elements.

* * * * *